United States Patent [19]

Welty, Jr., deceased et al.

[11] 4,164,546

[45] Aug. 14, 1979

[54] METHOD OF REMOVING NITROGEN OXIDES FROM GASEOUS MIXTURES

[75] Inventors: Albert B. Welty, Jr., deceased, late of Westfield, N.J.; by Doris M. Prescott, executrix, Houston, Tex.

[73] Assignee: Exxon Research & Engineering Co., Florham Park, N.J.

[21] Appl. No.: 847,038

[22] Filed: Oct. 31, 1977

Related U.S. Application Data

[63] Continuation of Ser. No. 534,283, Dec. 19, 1974, abandoned, which is a continuation-in-part of Ser. No. 285,818, Sep. 1, 1972, abandoned.

[51] Int. Cl.$^2$ .............................................. B01D 53/34
[52] U.S. Cl. ..................................... 423/239; 423/244
[58] Field of Search ................. 423/513.2, 213.5, 239, 423/351, 244

[56] References Cited

U.S. PATENT DOCUMENTS

| | | | |
|---|---|---|---|
| 1,412,452 | 4/1922 | Coolbaugh | 423/244 |
| 3,279,884 | 10/1966 | Nonnenmacher et al. | 423/239 |
| 3,454,355 | 7/1969 | Ryason | 423/244 |
| 3,501,897 | 3/1970 | Van Helden | 423/244 |
| 3,795,730 | 3/1974 | Kalvinskas | 423/239 |
| 3,864,451 | 2/1975 | Lee et al. | 423/239 |

FOREIGN PATENT DOCUMENTS 1504331 10/1967 France ....................................... 423/239

Primary Examiner—G. O. Peters
Attorney, Agent, or Firm—W. Hoover; J. E. Luecke

[57] ABSTRACT

Nitrogen oxides are effectively removed from a gaseous mixture comprising the same and oxygen by adding ammonia thereto and contacting with a suitable catalyst for the nitrogen oxide-ammonia reaction. While the presence of sulfur dioxide is not essential to such removal, best results are achieved when sulfur dioxide is also present in the gaseous mixture. When sulfur dioxide is present, and particularly when the same is present in a concentration in excess of that required for most effective nitrogen oxide conversion, the excess sulfur dioxide may be separated prior to the nitrogen oxide conversion, simultaneously therewith or subsequent thereto.

13 Claims, No Drawings

METHOD OF REMOVING NITROGEN OXIDES FROM GASEOUS MIXTURES

CROSS-REFERENCE TO RELATED APPLICATIONS

This application is a continuation of copending application Ser. No. 534,283, filed Dec. 19, 1974 which in turn is a continuation-in-part of application Ser. No. 285,818, filed Sept. 1, 1972 both now abandoned.

BACKGROUND OF THE INVENTION

This invention relates to a method for reducing the concentration of one or more pollutants contained in a gaseous mixture. More particularly, this invention relates to a method for reducing the nitrogen oxide content of such a gaseous mixture.

Nitrogen oxides are, of course, generally present in significant amounts in gaseous mixtures such as flue gases which are formed by the combustion of a fossil fuel with air. The amount and type of nitrogen oxides in such flue gases depends on both the fuel nitrogen content and on combustion conditions, and may vary widely, from about 150 ppm to about 1500-2000 ppm. Generally, nitrogen oxide contents are greatest in flue gases produced from solid fuels. Moreover, sulfur oxides will be present when the fuel contains sulfur. In this regard, it should be noted that combustion of conventional high sulfur fuels, such as coal, residuum, and fuel oil, yield flue gases which, typically, contains about 0.1–0.5% by volume of sulfur oxides ($SO_x$), mostly in the form of $SO_2$ with small amounts of $SO_3$. The amount of sulfur oxides in flue gas can be reduced considerably by the use of low sulfur fuels, such as low sulfur coals or low sulfur or desulfurized oils. Such fuels are seldom sulfur-free, however, and, indeed, the sulfur content may be sufficiently high so that treatment of the flue gas to remove sulfur oxides is still necessary or desirable. Generally, some oxygen (typically about 1–8% by volume) will also be present due to the use of excess air in combustion. Moreover, the flue gas may contain small amounts of finely divided suspended particulate matter, such as carbonaceous material and fly ash. Ordinarily there is little or no carbon monoxide or gas phase hydrocarbons in flue gas. The principal constituents of flue gas are nitrogen, carbon dioxide and water vapor.

Processes for the removal of nitrogen oxides, commonly denoted $NO_x$, from various gases are known. Among the gases treated to remove $NO_x$ are internal combustion engines (particularly automobile) exhaust gases, nitric acid plant tail gas, and flue gas from stationary combustion sources. Various methods for reducing the quantity of $NO_x$ emissions have been proposed, including combustion modification and flue gas treatment. Flue gas treatment methods include catalytic decomposition of $NO_x$ under oxidizing conditions, nonselective catalytic reduction under reducing conditions, selective reduction of $NO_x$ with a suitable reagent such as ammonia under oxidizing conditions, adsorption of $NO_x$ by a solid adsorbent, and absorption of $NO_x$ with a suitable liquid such as aqueous alkaline solution or molten alkali metal carbonate. A comprehensive review of the state of the art is contained in a report by W. Bartok et al, "Systems Study of Nitrogen Oxide Control Methods for Stationary Sources", Report No. GR-2-NOS-69 (PB 192789), Nov. 20, 1969 (prepared under Contract No. PH-22-68-65 for Division of Process Control Engineering, National Air Pollution Control Administration). Section 5 (pages 5-1 to 5-65) in Volume II of this report is of particular interest. For convenience, however, some references, including several which are cited in the foregoing report, will be specifically mentioned here.

It is known that nearly quantitative nonselective catalytic reduction of $NO_x$ under reducing conditons can be achieved, but that decomposition of $NO_x$ into nitrogen and oxygen under oxidizing conditions gives incomplete $NO_x$ removal. See, for example, H. C. Andersen et al, "Catalytic Treatment of Nitric Acid Plant Tail Gas", *Ind. Eng. Chem.*, 53, 199–204 (March 1961); M. Shelef et al, *Chemical Engineering Progress Symposium Series*, 67, 74–92 (1971). Examples of prior art teaching the selective reduction of nitrogen oxide with ammonia include U.S. Pat. No. 2,975,022 ($HNO_3$ tail gas; supported Pt group metal catalysts; 150°–400° C.); U.S. Pat. No. 3,008,796 ($HNO_3$ tail gas; supported iron, cobalt or nickel catalyst; 250°–800° F.); U.S. Pat. No. 3,279,884 ($HNO_3$ tail gas; oxide of vanadium, molybdenum, or tungsten as catalyst; 150°–400° C.); U.S. Pat. No. 3,328,115 ($HNO_3$ tail gas; platinum metal catalyst; 150°–400° C.); U.S. Pat. No. 3,449,063 (auto exhaust gas; catalyst of copper oxide on supports such as activated alumina; 250°–800° F.); U.S. Pat. No. 3,599,427 (auto exhaust gas; two-stage process in which $NO_x$ is removed in the second stage, using a CuO or Pt catalyst); and German Patent No. 1,259,298 (flue gas; $Fe_2O_3$—$Cr_2O_3$—$CrO_3$ catalyst). Attention is also called to *Ind. Eng. Chem.*, 53, 199–204 (March 1961) supra, which discloses the selective reduction of $NO_x$ with ammonia under oxidizing conditions at about 150°–250° C., using platinum, palladium, ruthenium, cobalt or nickel as the catalyst; and *Chem. Eng. Progress Symposium Series*, 67, 74–92 (1971), supra, which discloses the reduction of $NO_x$ by $NH_3$ using a noble metal catalyst or nickel at a temperature below 350° C. See also *Atmospheric Environment*, 6, 297–307 (1972), which discloses reduction of NO with ammonia over barium-promoted copper chromate and over nickel oxide plus copper oxide on gamma alumina catalysts. K. Otto and M. Shelef, *The Journal of Physical Chemistry*, 76, 37–43 (1972), discuss the reaction of NO and ammonia over pure, low surface area (0.88 m²/g) copper oxide at 150°–200° C. See, on the other hand, H. J. Hall et al, *Environmental Science and Technology*, 5, 320–326 (April 1971) wherein prior processes for catalytic removal of nitrogen oxides from nitric acid plant tail gas by reaction with ammonia was characterized as "unsuccessful".

The selective reduction of nitrogen oxides with hydrogen under oxidizing conditions has also been proposed; see Bartok et al, Report GR-2-NOS-69 (PB 192,789) supra; temperatures used in this case are generally lower than those used with ammonia.

Much of the art on the selective catalytic reduction of nitrogen oxide by ammonia suggests the use of noble metal catalysts, suchh as platinum. Noble metal catalysts are easily poisoned by sulfur, however, and therefore ordinarily cannot be used for treatment of flue gas generated in stationary combustion sources. Even when low sulfur fuel is used, the sulfur oxide content is generally sufficient to poison a noble metal catalyst within a comparatively short time. Also, even in a sulfur-free environment such noble metal catalysts have limited life and are expensive.

SUMMARY OF THE INVENTION

In accordance with this invention, gaseous mixtures such as flue gases are treated in order to reduce the nitrogen oxide content thereof by adding ammonia thereto and contacting under oxidizing conditions with a suitable catalyst for the nitrogen oxide-ammonia reaction. In one embodiment, wherein the gaseous mixture is either free of sulfur dioxide or contains sulfur dioxide in a concentration below that which would require separation thereof prior to any venting to the atmosphere, the ammonia may be added to the gaseous mixture either prior to or simultaneously with the catalyst contacting. Moreover, and for reasons more fully indicated hereinafter, it is within the scope of this particular embodiment to add a sufficient amount of sulfur dioxide to the gaseous mixture so as to enhance the catalytic conversion of the nitrogen oxide or oxides. In a second embodiment, and wherein the gaseous mixture contains sufficient sulfur dioxide to make separation thereof either desirable or necessary, a substantial portion of the sulfur dioxide will be separated from the gaseous mixture prior to effecting the nitrogen oxide conversion. Care will, however, be exercised in controlling the conditions used during such separation so as to retain a sufficient quantity of sulfur dioxide in the gaseous mixture to enhance the catalytic conversion of the nitrogen oxide or oxides in the subsequent treatment. In a third embodiment, and also wherein the gaseous mixture contains sufficient sulfur dioxide to make separation thereof either desirable or necessary, the sulfur dioxide will be separated from the gaseous mixture after the nitrogen oxide conversion has been effected. In a fourth embodiment, and also wherein separation of sulfur dioxide is either necessary or desirable, the nitrogen oxide conversion and the sulfur dioxide separation will be effected simultaneously. As indicated more fully hereinafter, the latter embodiment is most preferred.

DETAILED DESCRIPTION OF THE INVENTION

In accordance with the first embodiment of this invention, a gaseous mixture such as a combustion gas from a stationary source (i.e., flue gas) is treated in a continuous process in order to reduce the nitrogen oxide content thereof. Broadly, this is accomplished by adding ammonia to the gaseous mixture and contacting with a suitable catalyst at an elevated temperature. As indicated previously, the ammonia may be added prior to or simultaneously with the catalyst contacting. Best results are, however, generally achieved when the ammonia is added prior to the catalyst contacting and such addition is preferred in this embodiment of the invention.

The quantity of ammonia added to the gaseous mixture is at least about 0.5 mole for each mole of nitrogen oxides ($NO_x$) present. This represents at least approximately 0.7 times the stoichiometric quantity required for the reduction of nitrogen oxides, based on the assumption that the nitrogen oxides consist of 90% by volume of NO and 10% by volume of $NO_2$. The reduction of nitrogen oxide can be represented according to the equations:

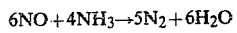

$$6NO + 4NH_3 \rightarrow 5N_2 + 6H_2O$$

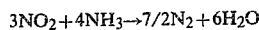

$$3NO_2 + 4NH_3 \rightarrow 7/2 N_2 + 6H_2O$$

The preferred quantity of ammonia is at least about 0.6 moles per mole of $NO_x$; most preferred quantities of ammonia range from about stoichiometric (0.73 moles of ammonia per mole of $NO_x$ when $NO_x$ is 90% NO and 10% $NO_2$) to about 5 moles of ammonia per mole of $NO_x$. Once the stoichiometric quantity of ammonia is exceeded, nearly quantitative reduction of $NO_x$ is achieved, and increases in the quantity of ammonia do not result in significantly lower $NO_x$ effluent values. On the other hand, with the catalysts which are used in accordance with this invention, catalytic oxidation of ammonia with nitric oxide by oxygen is avoided or at least held to a minimim, so that a substantial excess of ammonia does not result in substantial quantities of effluent $NO_x$. Ammonia is not ordinarily detected in the effluent flue gas, even when a substantial excess of ammonia is fed.

Generally, the catalysts useful in the invention will be supported, thus comprising an active material, such as copper oxide or ferric oxide, and an inert porous carrier or support, such as alumina, alumina-silica, silica, etc. The preferred catalyst in all embodiments is copper oxide on alumina. Iron oxide on either alumina, alumina-silica, or silica, and copper oxide-iron oxide mixtures on alumina, are also particularly effective catalysts for all embodiments. In each case, the carrier will, generally, have a surface area (by nitrogen absorption or BET method) of at least 40 square meters per gram.

While copper (preferably in the form of copper oxide initially) is the preferred active material, the active material of the catalyst more broadly may be a non-noble transition metal, which may be in the form of a free metal, a metal oxide, or other metal compound such as the metal sulfate. Usually, the active material of the catalyst as charged to the reactor is in the form of a metal oxide. The active catalyst material may include either one or more that one metal. Transition metal oxides which may be used in accordance with this invention include the oxides of non-noble metals of Group I-B, e.g., copper; Group V-B, e.g., vanadium; Group VI-B, e.g., chromium, molybdenum, and tungsten; Group VII-B, e.g., manganese; and the iron group metals of Group VIII, e.g., iron, cobalt and nickel. Mixtures of copper with one or more non-noble metals of Group VI-B or Group VIII (both ordinarily in the oxide form initially) are desirable catalysts. A vanadium-potassium silica catalyst of the type commonly used for $SO_2$ oxidation to $SO_3$ can be used for certain embodiments of this invention. The noble metals, e.g., platinum and palladium, are avoided because they are poisoned by sulfur oxides, which are usually present in the gases treated according to this invention and because they do not have adequate life and are expensive. The catalyst metal (or metals) must not only be nonsusceptible to sulfur poisoning, but must also be active as an $NO_x$ reduction catalyst even in the sulfated form. Most of the transition metal oxides contemplated herein form sulfates when exposed to sulfur dioxide and oxygen, and sulfation will occur in the continuous process contemplated herein. Even the trace amount of sulfur often present in nominally sulfur-free gaseous fuels is sufficient to sulfate the catalyst after a time.

Broadly, essentially any inert refractory carrier materials, such as alumina, alumina-silica, silica and the like may be used as supports or carriers for the catalyst used in this invention. Generally, the carrier will be in a porous form having a surface area (BET) of at least about 40 square meters per gram. Preferred carriers are high surface area porous materials having surface areas of at least 80 and preferably at least about 100 square meters per gram. The choice of a carrier depends in large measure on the choice of active material. Thus, copper oxide on alumina or alumina-silica is an effective catalyst, but copper oxide on silica is less effective.

As indicated previously, the method of this embodiment of the invention, as well as the methods of the other embodiments, will effectively reduce the $NO_x$ content of any gaseous mixture comprising $NO_x$ and oxygen. Surprising, however, it has been discovered that the methods of all embodiments are most effective when a portion of the metal catalyst is present as a metal sulfate and when the gaseous mixture being treated also comprises a sufficient concentration of $SO_2$ and oxygen to prevent the reduction of the metal sulfate to either the corresponding metal oxide or the free metal. In this regard, it should be noted that ammonia is, apparently, an effective reducing agent for the metal sulfates and that some reduction occurs in the catalyst bed even in the net oxidizing atmosphere. The presence of $SO_2$ is then, believed necessary to offset the effect of any such reduction and to maintain at least a portion of the catalyst material in the sulfated form. In this regard, it should also be noted that it has been determined that maximum $NO_x$ conversion at any given set of operating conditions will be realized when at least about 1.4 mol % of the active catalytic material is present as a metal sulfate and that at least this portion of the active catalyst will remain in the sulfate form when the gaseous mixture being treated contains at least about 50 ppm (by volume) $SO_2$. For these reasons, then, it is preferred, in all embodiments of this invention, to operate with a catalyst or active component which comprises at least about 1.4 mol % of a metal sulfate and to treat a gaseous mixture comprising at least about 50 ppm (by volume) $SO_2$ and most preferred to operate with a catalyst comprising at least about 3.2 mol % of a metal sulfate and to treat a gas mixture comprising at least about 100 to about 150 ppm (by volume) $SO_2$. In this regard, it should be noted that while about 50 ppm $SO_2$ are required to maintain a given level of metal sulfate in the catalyst, $SO_2$ concentrations in excess of this minimum will, generally, result in a net sulfation of any free metal or metal oxide in the catalyst (in an oxidizing atmosphere), thus increasing the concentration of metal sulfate in the catalyst with operating time. It follows, then, that when treating a gaseous mixture comprising more than about 50 ppm $SO_2$ it is not really necessary to take any positive action to insure the desired minimum content of sulfate in the catalyst since this will be achieved as the result of net sulfation with continued operation. The time required, on the otherhand, will vary depending upon the actual $SO_2$ concentration with the desired degree of sulfation being achieved more rapidly at higher $SO_2$ concentrations. For this reason, then, it is most preferred to treat high $SO_2$ content gaseous mixture for the purpose of converting the $NO_x$ and to separate the $SO_2$ either simultaneously with or subsequent to the $NO_x$ conversion. In this regard, it should be noted that simultaneous separation is particularly preferred since less equipment and fewer process steps are, generally, required with this mode of operation.

In general, the temperature at which the ammonia and the gaseous mixture comprising one or more oxides of nitrogen will be contacted with the catalyst will vary with the particular catalyst or catalysts actually employed as well as the chemical structure thereof. For example, iron oxide would, generally, become effective at a lower temperature than copper oxide, while copper oxide would become effective at a lower temperature than vanadium oxide. There is, however, a relatively broad range of temperatures within which the catalysts of this invention are effective or within which the same become effective as catalysts. Generally, these temperatures are above about 500° F. It should be noted, however, that high temperatures are undesirable for several reasons, such as potential damage to the catalysts and undesirable side reactions, and should, therefore, be avoided. In this regard, it should be noted that high temperatures favor the production and liberation of $SO_3$, especially when completely sulfated catalysts are employed. Again, the exact temperature at which $SO_3$ production becomes a problem will vary with the particular catalyst employed. Generally, however, $SO_3$ production is not a problem with any of the catalysts useful in the methods of this invention below about 850° F. and at this temperature it is a problem only with sulfated copper oxide; i.e., $CuSO_4$. For these reasons, then, the contacting will, generally, be effected at a temperature within the range from about 500° to about 950° F., preferably at a temperature within the range from about 600° to about 850° F., and most preferably at a temperature within the range from about 650° to about 750° F.

In electric power plant operations, it is convenient to treat the flue gas either between the economizer and the air preheater, where the temperature is typically about 600°–750° F., or to treat the gas emerging from the air preheater which is typically at a temperature of about 300° F. $NO_x$ reduction catalysts which are active at temperatures as low as 300° F. are easily poisoned and have limited life; catalysts which have long life require higher temperatures. In accordance with this preferred embodiment, ammonia is added to a flue gas stream after the gas stream has passed through the economizer in a conventional electric power generating plant.

Generally, the contact between the gaseous mixture, the ammonia, and any $SO_2$ which might be added and the catalyst is preferably achieved by passing the gas through a fixed bed of the catalyst. The space velocity may range from about 1000 V/V/Hr. upward to 100,000 V/V/Hr. or more. Low pressure drop is mandatory in electric power installations and in many other installations where the combustion unit is operated at substantially atmospheric pressure or at only a slight superatmospheric pressure in order to avoid excessive energy loss. In electric power installations, the pressure drop through the catalyst bed must ordinarily not exceed about 25 inches of water and frequently must be less than this amount. For any given space velocity, particle size and shape, the combination of gas velocity and bed depth is chosen which gives a suitably low pressure drop, usually not greater than 25 inches of water and more usually about 5 inches of water.

Copper oxide on alumina gives surprisingly effective results in removal of nitrogen oxides at inlet temperatures of about 600°–950° F. and preferably about 650°–750° F., especially when the treated gaseous mixture contains at least about 50 ppm $SO_2$. Copper oxide is thus well suited for use in electric power installations. Preferred space velocities with copper oxide on alumina are about 3,500 to about 20,000 V/V/Hr. While other materials are known which are more active as selective $NO_x$ reduction catalysts, many such other materials (particularly the noble metals) do not fulfill the other desirable characteristics of a catalyst of this invention, i.e., that, at temperature above about 600° F., they retain their effectiveness even after long exposure to sulfur oxides and oxygen, which, as earlier noted, converts the catalyst metal from the oxide form to a sulfated form; and that they do not oxidize ammonia to $NO_x$. Iron oxide on a suitable high surface area support also fulfills the conditions of a good catalyst for this invention, and is in fact more active than copper oxide. The preferred inlet temperatures for iron oxide catalyst are from about 600° to about 850° F. and most preferably 650°–750° F., and preferred space velocities are from about 4,000 to 25,000 V/V/Hr. A mixed catalyst or contact mass comprising both iron oxide and copper oxide may also be used effectively, if desired.

It will, of course, be appreciated that the catalyst may gradually lose activity over a long period of time. This may occur due to deposition of small amounts of carbonaceous material and/or fly ash on the surface and/or to chemical change of the catalyst surface. When this occurs, the catalyst can be regenerated by treating with air or another oxygen-containing gas in order to remove carbonaceous material and/or fly ash. Such regeneration will, of course, be carried out on a given catalyst as required; only infrequent or occasional regeneration is ordinarily necessary.

The catalyst can be prepared by techniques which are known in the catalyst and sorbent preparation art. The carrier may be of any desired shape, e.g., spheres or extrudates (which are essentially cylindrical), and may be of any desired dimension. However, it is preferred to use a catalyst in which the carrier particles are of such shape that the void fraction of the catalyst bed is at least 0.50 and preferably at least 0.60. Saddles (e.g., in the shapes shown in U.S. Pat. Nos. 2,639,909 and 3,060,503) and rings are among the shapes giving the required void fraction. Use of a catalyst shape giving a bed having a high void volume results in much lower pressure drop for a given space velocity. Thus, it is much easier to achieve a maximum pressure drop of 25 inches of water (or less) through that catalyst bed when the catalyst bed has a void fraction of at least 0.50.

Conventional methods for impregnating the carrier with the desired active material may be used. Thus, a previously calcined carrier may be impregnated by known means using known impregnating solutions, e.g., aqueous copper nitrate where a copper oxide surface layer is desired, followed by calcination to convert the impregnating salt to the corresponding oxides. The oxide may be reduced to the free metal with hydrogen or other reducing gas where desired. Conventional impregnating techniques will give catalysts in which the active material is dispersed in the pores of the carrier throughout the entire mass of carrier material.

If desired, the active material may be confined to a relatively narrow band near the surfaces of the carrier particles in order to facilitate contact between the active material and the flowing gas (External surfaces as used herein include those surfaces which are inherent in the particle shape and not due to internal pore structure. In the case of rings, a preferred carrier shape, the external surfaces of the carrier include the inside cylindrical surface as well as the outside cylindrical surface and the ends). The band of impregnated material in this case ordinarily extends to a depth of not more than about 0.035 inches inwardly from the external surfaces, and will ordinarily occupy no more than about 70% of the carrier volume, more typically about 20% to 40% of the carrier volume. Zone impregnation or "surface impregnation" can be achieved by spray coating the carrier particles with an aqueous impregnating solution while tumbling, or by the techniques described in U.S. Pat. No. 2,746,936, or by other desired means. A preferred surface impregnation technique is to immerse calcined carrier particles in a polar water-immiscible volatile liquid, preferably a $C_5$–$C_{10}$ primary alcohol such as n-pentanol or $C_6$ "oxo" alcohol (a mixture of isomeric $C_6$ primary alcohols), transfer the carrier particles from the water-immiscible liquid to an aqueous impregnating solution, such as copper nitrate, immerse in the aqueous solution for a controlled time which depends on the desired depth of impregnation, and then dry and calcine the particles. An advantage of a surface impregnated catalyst over one in which the active material is distributed throughout the pores of the carrier is that more effective use of the active material is achieved.

In general, the method of this invention can be accomplished at essentially any pressure. Ordinarily, however, the process of this invention is carried out at substantially atmospheric pressure, especially in electric power installations.

In accordance with further embodiments of this invention, and when the sulfur oxide content of the gaseous mixture to be treated is sufficiently high as to require removal of both nitrogen oxides and sulfur oxides or to make such removal desirable, the sulfur oxides can be removed either before or after nitrogen oxide removal or simultaneously therewith. In a second embodiment of the invention, then, sulfur oxides are removed first from a flue gas or other gaseous mixture containing oxygen, $SO_x$ and $NO_x$; ammonia is then added to the desulfurized gas stream and the gas stream containing added ammonia is contacted with a nitrogen oxide removal catalyst. In this case, conventional means for the removal of sulfur dioxide from flue gases may be used for the first stage. Processes using a dry solid sorbent, as illustrated for example in U.S. Bureau of Mines Report RI 5735 (1961) (alkalized alumina), U.S. Pat. No. 3,411,865 (alkalized alumina promoted with iron oxide and antimony oxide), or in British Pat. No. 1,089,716 (copper oxide on alumina), are greatly preferred over wet processes using an aqueous solution, since wet processes are carried out at the temperatures below the atmospheric boiling point of water, necessitating reheating of the effluent gases in order to achieve a temperature suitable for $NO_x$ removal with catalysts which have suitably long life. Addition of ammonia to the desulfurized flue gas (typically containing about 10% of the $SO_2$ contained in the incoming flue gas) and catalytic reduction of nitrogen oxides are carried out as aforedescribed. The use of a sulfur-resistant catalyst as aforedescribed is important since the quantity of sulfur oxides contained in the desulfurized flue gas is enough to poison a sulfur susceptible catalyst, such as a noble metal catalyst.

According to a third embodiment of this invention, nitrogen oxides are reduced in a first stage and then sulfur oxides are removed in a second stage from a stream of a gas such as flue gas which originally contains oxygen, nitrogen oxides, and sulfur oxides. According to this embodiment of the invention, ammonia is added to the waste gas stream and the gas stream is contacted with a non-noble metal catalyst for the selective reduction of $NO_x$ by ammonia under oxidizing conditions as previously indicated. Sulfur oxide removal can be accomplished by known means. Either a wet process using an aqueous absorbent solution, or a dry process using a solid sorbent, can be used, Where a $K_2O-V_2O_5$ catalyst has been used for $SO_x$ removal, the sulfur oxide content of the gas is largely or entirely in the form of $SO_3$, which can be removed by known means.

PREFERRED EMBODIMENT

According to a fourth and preferred embodiment of this invention, sulfur oxides and nitrogen oxides are simultaneously removed from a gaseous mixture such as glue gas in a cyclic regenerative process. The gaseous mixture which is treated according to this embodiment of the invention is, generally, one formed by combustion of a sulfur-containing solid fuel, such as coal, or a sulfur containing liquid fuel, such as fuel oil (including residuum or other heavy ends) with air in a burner. The flue gas thus generated normally contains a small amount of oxygen, e.g., about 0.5 to about 8% by volume, due to the use of excess air; approximately 0.1–0.5% and more usually about 0.2–0.3% by volume with $SO_2$, with traces of $SO_3$, the quantities of these sulfur oxides depending on the quantity of sulfur in the fuel; and approximately 150 to about 1500 ppm of nitrogen oxides (both NO and $NO_2$, principally the former), the amounts of which depend both on the fuel nitrogen content and on the combustion temperatures and conditions. Flue gas formed in electrical power generation units is a common source of flue gas which can be treated according to this invention. About 90% of the incoming sulfur oxides ($SO_x$) and about 90% of the incoming nitrogen oxides ($NO_x$) can be removed by the process of this invention.

In this embodiment, ammonia is added to the gas stream either upstream of the catalyst-sorbent or simultaneously with the contacting therewith and preferably when the temperature of the gas stream is about 600° to about 900° F. This can, of course, be conveniently accomplished, when treating a power plant flue gas, by adding the ammonia after the gas stream has passed through the economizer, in a conventional electric power generating plant, where the temperature is more usually about 600° to about 700° F. Again the quantity of ammonia that should be added is at least about 0.5 mole for each mole of nitrogen oxides (denoted $NO_x$) present and again, the preferred quantity of ammonia is at least 0.6 moles per mole of $NO_x$ with most preferred quantities being within the range from about stoichiometric to about 4 moles of $NH_3$ per mole of $NO_x$. As is the previously described embodiments, once the stoichiometric quantity of ammonia is exceeded, nearly quantitative reduction of $NO_x$ is achieved, and increases in the quantity of ammonia do not result in significantly lower $NO_x$ effluent levels. Ammonia is not ordinarily detected in the effluent gas, however, even when substantial excess of ammonia is fed. Also, the effluent $NO_x$ and $SO_x$ levels are both quite low even when a substantial excess of ammonia is fed. This suggests that no significant oxidation of ammonia by oxygen to nitric oxide takes place.

In this embodiment, the gas stream to be treated and the ammonia are, generally, contacted with a catalyst-sorbent contact mass at a gas inlet temperature of about 600° to about 900° F., preferably about 650° to about 800° F., in order to reduce the quantities of both sulfur dioxide and nitrogen oxides. Again, the catalyst-sorbent contact mass will comprise an active material and an inert porous carrier or support. Again, the active material may comprise any one or more of the aforedescribed metals, metal oxides or metal sulfates. In this embodiment, however, metal sulfates cannot be used as the sole active component since it is essential that the active component function as both a catalyst for the $NO_x$—$NH_3$ reaction and as an adsorbent for $SO_x$ and the metal sulfates will not satisfy the latter criterion. It is, on the other hand, within the scope of this embodiment to employ a mixture comprising a metal sulfate and a metal or metal oxide as the starting catalyst-sorbent, and when such mixtures are employed, at least about 1.4 mol % of the total active material will, advantageously, be in a sulfate form. In this regard, it should be noted that, as in the previously described embodiments, the metal sulfates are the most effective $NO_x$—$NH_3$ reaction catalysts and substantially complete conversion of all $NO_x$ will be realized immediately (following a regeneration cycle) when this concentration of a metal sulfate catalyst is present initially. When treating gas mixtures comprising relatively large concentrations of $SO_x$ (about 1000 ppm or more) however, sulfation of a starting metal or metal oxide to the extent required for most effective $NO_x$ conversion will occur rapidly. Good results are, therefore, rapidly achieved when starting with a metal or metal oxide catalyst-sorbent form and since regeneration to this form is most easily achieved, such operation is most preferred.

Broadly, the active catalyst-sorbent may comprise only a single component (e.g., copper oxide) or a mixture of such components (e.g., potassium oxide and vanadium pentoxide) which serves both as a selective $SO_x$ removal agent and as a catalyst for the selective reduction of $NO_x$. Alternatively, the active material may consist of a mixture comprising one or more $SO_2$ removal agents and one or more $NO_x$ reduction catalyst; e.g., a mixture of copper oxide with an oxide of a metal of Group VI-B or the iron group, i.e. iron oxide, cobalt oxide, nickel oxide, chromium oxide, molybdenum oxide or tungsten oxide. Again, and as in the previous embodiments, the $NO_x$ reduction catalyst must retain its catalytic activity over the entire range of normal flue gas desulfurization temperatures, even when sulfated (e.g., by reaction of the metal oxide catalyst with $SO_2$ and oxygen), and must not be poisoned by sulfur oxides. The $SO_x$-removal material must, on the other hand, be capable of selectively removing sulfur oxides and of being regenerated. Active materials comprising a noble metal are avoided because they are poisoned by sulfur oxides. During the course of an operating cycle, the metal or metals in the active material may go through several forms, e.g., oxide, sulfate, and free metal.

As indicated previously, the active material will, generally, be deposited or supported on a high surface area carrier, having a surface area (by nitrogen adsorption) of at least about 40, preferably at least about 80 and most preferably at least about 100 square meters per gram. Again, essentially any inert refractory carrier materials, such as alumina, alumina-silica, silica, and the like may be used used in this embodiment for this purpose and as in the previous embodiments, the choice of carrier material will be dictated to some extent by the choice of active material.

Again, contact between the gas mixture being treated and the catalyst-sorbent contact mass is preferably achieved by passing the gas through a fixed bed of the contact mass. The space velocity must, however, be lower and, generally will range from about 1000 to about 10,000 V/V/Hr., with space velocities in the range of about 2000 to about 5000 V/V/Hr. being most preferred. In this regard, it should be noted that space velocity in this embodiment is limited by the requirements for sulfur dioxide removal, since nitrogen oxide removal can be achieved effectively at much higher space velocities than sulfur dioxide removal. Ordinarily the process of this embodiment will be carried out at substantially atmospheric pressure, especially in electric power installations, although higher or lower pressures could, effectively, be employed.

In accordance with this embodiment, it has surprisingly been found that copper oxide on alumina gives effective removal of both sulfur dioxide and nitrogen oxide under conditions for optimum $SO_2$ removal, e.g., temperature of about 600°–900° F. and space velocities of about 1000–5000 V/V/Hr. as aforedescribed. In this regard, it should be noted that, while other materials are known which are more effective in the removal of $NO_x$ than is copper oxide, such other materials do not fulfill the other desirable criteria of a catalyst-sorbent contact mass useful in this embodiment, e.g., that they not be poisoned by sulfur oxides and that they be capable of removing sulfur oxides and of being regenerated.

In this embodiment, the catalyst-sorbent contact mass can be regenerated with a reducing gas, such as hydrogen, carbon monoxide, mixtures of theses, or a hydrocarbon, such as methane, ethane, propane or butane. The reducing gas may be mixed with steam. A preferred regeneration gas is a mixture of about 10 to 50 mole % hydrogen and about 50 to 90 mole % steam; a mixture of about 40% by volume hydrogen and 60% by volume steam is especially preferred. The regeneration gas inlet temperature is ordinarily approximately the same as the flue gas inlet temperature, e.g., about 600°–900° F. It will be recognized that the regeneration gases herein are also conventional regeneration gases for flue gas desulfurization sorbents in processes where $NO_x$ removal is not an object.

The cyclic process of this embodiment of the invention includes a sorption (or desulfurization) step or period during which the gaseous mixture to be treated and containing oxygen, sulfur dioxide, (either with or without small amounts of $SO_3$) and nitrogen oxides is passed into contact with the contact mass; followed by a regeneration period. The reactor may be purged with an inert gas such as nitrogen or steam after both the sorption and the regeneration periods if desired. Generally, in this embodiment, a stream of flue gas or other gaseous mixture is contacted with the contact mass until sulfur dioxide breaks through into the effluent gas. Breakthrough may be defined as occurring when the concentration of $SO_2$ in the effluent gas over a whole sorption cycle reaches a stated percentage, e.g., 10% of the amount of $SO_2$ fed in the incoming gas over the whole sorption period. The sorption period is stopped and the catalyst mass is regenerated when breakthrough occurs.

As in the previously described embodiment, the contact mass can be prepared by techniques which are known in the catalyst and sorbent preparation art. The carrier may be of any desired shape, e.g., spheres, extrudates (which are essentially cylindrical) or rings, and may be of any desired dimension. A previously calcined carrier may be impregnated by known means using known impregnating solutions, e.g., aqueous copper nitrate when a copper oxide surface layer is desired, followed by calcination to convert the impregnating salt to the corresponding oxide. The oxide may be reduced to the free metal with hydrogen or other reducing gas where desired. Conventional impregnating techniques will give a contact mass in which the active material is dispersed in the pores of the carrier material throughout the entire mass of carrier material. More effective results are achieved according to this invention when the active material is confined to a relatively narrow band near the external surfaces of the carrier particles. This band will ordinarily be an outer surface layer having a depth not over 0.035 inches and occupying no more than 70%, preferably about 20% to 40%, of the carrier volume. Zone impregnation or "surface impregnation" can be achieved by spray coating the carrier particles with an aqueous impregnating solution while tumbling, or by the techniques described in U.S. Pat. No. 2,746,936, or by other desired means. A preferred surface impregnation technique is to immerse calcined carrier particles in a polar water-immiscible volatile liquid, preferably $C_5$–$C_{10}$ primary alcohol such as n-pentanol or $C_6$ "oxo" alcohol (a mixture of isomeric $C_6$ primary alcohols), transfer the carrier particles from the water-immiscible liquid to an aqueous impregnating solution such as copper nitrate, immerse in the aqueous solution for a controlled time which depends on the desired depth of impregnation, and then dry and calcine the particles. An advantage of a surface impregnated contact mass over one in which the active material is distributed throughout the pores of the carrier is that higher $SO_2$ removal capacity as measured by the percentage of active material which is sulfated at the time that $SO_2$ breakthrough occurs, is higher in the case of surface impregnated contact masses than in the case of conventional fully impregnated contact masses. Also, it appears that nitrogen oxide removal is slightly higher in the case of surface impregnated contact masses.

The concurrent abatement of both $SO_x$ and $NO_x$ does not impair the efficiency of the catalyst-sorbent contact mass for removal of either pollutant. On the contrary, it appears that sulfur oxide removal is actually enhanced when ammonia is added and $NO_x$ is simultaneously removed according to the present process. Furthermore, the quantities of $NO_x$ reduced appears to be greater when $SO_2$ is present in the gas stream, provided the non-noble contact materials specified herein are used. This is quite surprising in view of the fact that many catalysts which are effective for the removal of $NO_x$, notably the noble metal catalysts, are poisoned by sulfur compounds, and would therefore not be usable in the present process.

This invention will now be described further with respect to specific embodiments thereof as illustrated in the following examples.

EXAMPLE 1

This example describes the selective reduction of nitrogen oxides by ammonia in a continuous process carried out in a laboratory reactor.

Ammonia was added to synthetic flue gas containing about 3–5% by volume of oxygen, about 2700 ppm by volume of sulfur dioxide, and 990 to 1010 ppm by volume of nitrogen oxides (believed to be about 90% NO and 10% $NO_2$ based on thermodynamic consideration) in a series of runs, and the resulting gas mixture in each run was passed through a laboratory reactor, ⅞ inches in diameter, containing a fixed bed, about 3 inches deep, of commercially prepared copper oxide on gamma alumina balls about ⅛ inch in diameter. The copper content of the catalyst was about eight percent by weight and the catalyst was totally impregnated. Space velocity was 5000 V/V/Hr. Gas inlet temperatures of 650° F. and 700° F. were used. The amounts of ammonia ranged from 0.25 to 0.80 moles of ammonia per mole of $NO_x$; the $NH_3/NO_x$ mole ratio remained constant in each run. Table I below shows the percentage conversion at various $NH_3/NO_x$ mole ratios and the indicated gas inlet temperatures.

TABLE I

| $NH_3/NO_x$ Mol Ratio | Gas Inlet Temp. °F. | % $NO_x$ Converted |
|---|---|---|
| 0.25 | 650 | 35 |
| 0.33 | 650 | 45 |
| 0.33 | 700 | 50 |
| 0.38 | 650 | 52 |
| 0.4 | 700 | 65 |
| .46 | 650 | 65 |
| 0.53 | 700 | 78 |
| 0.67 | 650 | 95 |
| 0.67 | 650 | 95 |
| 0.73 | 650 | 100 |
| 0.8 | 650 | 100 |
| 0.8 | 700 | 100 |

As Table I shows, there was an essentially linear relationship between the percentage $NO_x$ converted and the $NH_3/NO_x$ mole ratio when substoichiometric amounts of ammonia (i.e. less than 0.73 moles of ammonia per mole of $NO_x$, based on the assumption that $NO_x$ is 90% NO and 10% $NO_2$) were used. When stoichiometric or greater amounts of ammonia were used, $NO_x$ conversion was essentially quantitative. There was no significant difference between conversions attained at gas inlet temperatures of 650° F. and 700° F. In other experiments at similar conditions, it was observed that $NO_x$ conversions were notably lower when the gas inlet temperature was 600° F. The nitrogen oxide content of the effluent stream was measured with a Dynasciences air pollution monitor instrument equipped with that company's NX-130 "total oxides of nitrogen" sensor having 550 ppm, 1500 ppm, and 5000 ppm scales. This instrument was manufactured by Dynasciences Corp., a subsidiary of the Whittaker Corporation, Los Angeles, Calif.

EXAMPLE 2

This example describes the simultaneous removal of nitrogen oxides and sulfur oxides from flue gas, using a fixed bed of copper oxide on alumina as the catalyst. The reactor in this experiment was a tubular reactor, 52 inches long, and 3 inches in inside diameter, having an electrical heating jacket surrounding the reactor tube in order to prevent heat losses therefrom. The reactor contained a fixed catalyst bed of copper oxide on alumina rings, 48 inches deep, with 4 inches of unimpregnated rings at the bottom of the reactor. The catalyst bed volume was 0.196 cubic feet, the catalyst bed weight was 2684.4 grams, and the catalyst bed copper content was 0.605 gram moles (39.1 grams), representing an overall copper content of 1.45 percent by weight. The catalyst bed consisted of three sections, designated A, B and C from top to bottom, each having slightly different particle dimensions, porosity characteristics, and copper contents. Catalyst A had a surface area (BET method) of 176 $m^2/g$, a pore volume in small pores (BET method) of 0.38 cc/g, and a pore volume in large pores (mercury porosimeter method) of 0.24 cc/g. Catalysts B and C had approximately the same surface area and total pore volume as Catalyst A, but had a larger fraction of the pore volume in larger pores. Other physical properties are given in Table II below. The ends of each particles were formed by non-parallel planes; hence each particle has a maximum length and a minimum length, both of which occur in lines parallel to the axis and lying in the outer surfaces of the particle. The axial length is the mean of the maximum and minimum lengths. The catalyst in all three bed sections was a surface-impregnated catalyst, in which all of the copper is deposited in annular zones extending inwardly a specified depth from the outer surface, and inwardly the same specified depth from the inner surface. Properties are given in Table II below.

TABLE II

| | Catalyst | | |
|---|---|---|---|
| | A | B | C |
| Length, max., in. | 0.609 | 0.552 | 0.552 |
| Length, min., in. | 0.453 | 0.350 | 0.350 |
| Diameter, outside, in. | 0.530 | 0.523 | 0.523 |
| Diameter inside, in. | 0.248 | 0.250 | 0.250 |
| Bulk density, lb/ft$^3$ | 31.7 | 31.2 | 31.2 |
| Wt. %. Cu, overall | 1.5 | 1.6 | 1.03 |
| Wt. % Cu, impreg. zone | 5.0 | 5.2 | 4.7 |
| Depth of impregnation, in. | 0.018 | 0.018 | 0.015 |
| Weight, grams | 480.0 | 1518.9 | 685.5 |
| Bed section depth, in. | 9 | 27 | 12 |

The catalysts for bed sections A, B and C were prepared from previously calcined (at 1000° F.) alumina. These three catalysts were prepared in separate batches. In each case, the carrier particles were immersed in hexyl alcohol (made by the oxo process) at room temperature, were then blotted dry on paper towels, and immediately impregnated with an aqueous copper nitrate solution by immersion of the particles in the solution for a controlled length of time. Copper nitrate solution concentrations and impregnation times are indicated in Table III below.

TABLE III

| | A | B | C |
|---|---|---|---|
| $Cu(NO_3)_2 \cdot 3H_2O$ conc., g/cc. | 0.7 | 0.7 | 0.7 |
| Impregnation time, min. | 1.75 | 1.70 | 1.00 |

This impregnation technique gave surface impregnated particles, that is, particles impregnated only to a specified depth (as indicated in Table II) from the inner and outer surfaces of the particle. The particles were air dried at 190° F. for 15 hours and were then calcined at 300° F. for one hour, at 500° F. for one hour, and at 800° F. for 3 hours. Calcination converted the copper nitrate to copper oxide.

Ammonia from a compressed gas cylinder was metered through a rotameter (Fisher-Porter, Model No. 08F-1/16"-20S), and was added to a stream of flue gas which was at a temperature of about 680° F. The flue gas was obtained by combustion of coal in a boiler, and containing about 6.8% by volume of oxygen and about 400–600 ppm by volume of nitrogen oxides. The flue gas also contained approximately 0.25–0.3% by volume of sulfur dioxide, traces of sulfur trioxide, and small amounts of fly ash. The hot flue gas mixture containing added ammonia was passed downwardly through the tubular reactor at a constant flow rate of 6.53 SCFM (reference temperature: 60° F.) corresponding to a space velocity (STP) of 2000 V/V/Hr. The ammonia feed rate was varied during the sorption period as will be shown in Table IV below. Samples of effluent flue gas were obtained at intervals approximately one minute (exact times, as measured from the beginning of each sorption period, will be shown in Table IV). These samples were passed through a 5-liter aqueous solution of a salt mixture containing 350 g. $KHCO_3$, 2220 g. $K_2CO_3$, 330 g. $KNO_2$, and 250 g. $KNO_3$, which quantitatively removed $SO_2$. The nitrogen oxide content of the desulfurized sample stream was measured with a Dynasciences air pollution monitor instrument equipped with that company's NX-130 "total oxides of nitrogen" sensor having 550 ppm, 1500 ppm, and 5000 ppm scales. This instrument was manufactured by Dynasciences Corp., a subsidiary of the Whittaker Corporation, Los Angeles, Calif. Alternatively, nitrogen oxides were determined by the Environmental Protection Agency-approved method, a wet method, using phenyldisulfonic acid as the test reagent, which is published in the Federal Register, Volume 36, No. 159, part II, pages 15718–15720, Tuesday, Aug. 17, 1971 (method 7—determination of nitrogen oxide emissions from stationary sources). This wet method will hereinafter be called the PDS method. The meter was calibrated against commercially prepared standard gas samples which in turn were analyzed by the PDS method.

The sorption period was continued for nine minutes. The reactor was then purged with a downflowing stream of steam for about one-half minute at about 1.25 SCFM. The catalyst-sorbent was then regenerated with a mixture of 40% by volume of hydrogen and 60% by volume of steam flowing downwardly through the reactor at a flow rate which provided about 0.4 gram moles of hydrogen over a period of one minute. This caused desorption of the chemically bound sulfur in the catalyst-sorbent as $SO_2$ and converted the catalyst-sorbent material predominantly to metallic copper. The reactor was then purged with a downflowing stream of nitrogen for about one-half minute at a rate of about 0.25 SCFM, and then a new sorption period was begun. A number of complete operating cycles were carried out in this manner.

Quantities of ammonia added, and $NO_x$ determinations on the effluent flue gas during the sorption period of several representative cycles are reported in Tables IV and V below. For the cycles given in Table IV, the effluent $NO_x$ determinations were made by the Dynascience Company Air Pollution Monitor instrument; some of the readings early in some of the cycles were influenced by the final reading of the previous cycles as there was no flow through the instrument's sample system during the two minute regeneration and purge periods. In the cycles given in Table V, the PDS method of $NO_x$ determination was used.

TABLE IV

| Cycle | Time Min. | Feed $NO_x$ ppm | Ammonia Added cc/min $NH_3$ | $NH_3/NO_x$ Feed mol ratio | Effluent $NO_x$ ppm | Method |
|---|---|---|---|---|---|---|
| 2497 | 0 | 553* | ↑ | ↑ | 553* | Meter |
|  | 2 | " | ↑ | ↑ | 300 | " |
|  | 3 | " | ↑ | ↑ | 120 | " |
|  | 4 | " | 277 | 2.5 | 60 | " |
|  | 5 | " | (average) | (average) | 35 | " |
|  | 6 | " | ↓ | ↓ | 22.5 | " |
|  | 7 | " | ↓ | ↓ | 16 | " |
|  | 8 | " | ↓ | ↓ | 15 | " |
|  | 9 | " | ↓ | ↓ | 15 | " |
| 2498 | 0 | 553* | ↑ | ↑ | 45*** | Meter |
|  | 1 | " | ↑ | ↑ | 150 | " |
|  | 3 | " | ↑ | ↑ | 45 | " |
|  | 4 | " | 267 | 2.4 | 30 | " |
|  | 6 | " | (average) | (average) | 20 | " |
|  | 7 | " | ↓ | ↓ | 18 | " |
|  | 8 | " | ↓ | ↓ | 17.5 | " |
|  | 9 | " | ↓ | ↓ | 15 | " |
| 2526 | 0 | 542** | ↑ | ↑ | 10*** | Meter |
|  | 1 | " | ↑ | ↑ | 110 | " |
|  | 4 | " | 122 | 1.1 | 29.5 | " |
|  | 5 | " | (average) | (average) | 20 | " |
|  | 7 | " | ↓ | ↓ | 14 | " |
| 2527 | 0 | 542** |  |  | 10*** | Meter |
|  | 0.75 | " | ↑ | ↑ | 100 | " |
|  | 1.5 | " | ↑ | ↑ | 50 | " |
|  | 3 | " | ↑ | ↑ | 42 | " |
|  | 4 | " | 38 | 0.35 | 55 | " |
|  | 5 | " | (average) | (average) | 57.5 | " |
|  | 6 | " | ↓ | ↓ | 77.5 | " |
|  | 7 | " | ↓ | ↓ | 100 | " |
|  | 8 | " | ↓ | ↓ | 105 | " |
|  | 9 | " | ↓ | ↓ | 110 | " |
| 2528 | 0 | 542** | ↑ | ↑ | 115 | Meter |
|  | 1 | " | ↑ | ↑ | 155 | " |
|  | 2 | " | ↑ | ↑ | 115 | " |
|  | 3 | " | 60 | 0.56 | 102.5 | " |
|  | 4 | " | (average) | (average) | 100 | " |
|  | 5 | " | ↓ | ↓ | 105 | " |
|  | 6 | " | ↓ | ↓ | 117.5 | " |
|  | 7 | " | ↓ | ↓ | 120 | " |
|  | 8 | " | ↓ | ↓ | 121 | " |
|  | 9 | " | ↓ | ↓ |  |  |
| 2532 | 0 | 542** | ↑ | ↑ | — | — |
|  | 1 | " | ↑ | ↑ | 190 | Meter |
|  | 2 | " | ↑ | ↑ | 145 | " |
|  | 3 | " | 107 | 1.0 | 125 | " |

TABLE IV-continued

| | | Ammonia Added | | | |
|---|---|---|---|---|---|
| | Time | Feed $NO_x$ | cc/min | $NH_3/NO_x$ Feed | Effluent $NO_x$ |
| Cycle | Min. | ppm | $NH_3$ | mol ratio | ppm | Method |
| | 4 | " | (average) | (average) | 101 | " |
| | 5 | " | ↓ | ↓ | 82.5 | " |
| | 6 | " | ↓ | ↓ | 70 | " |
| | 7 | " | ↓ | ↓ | 60 | " |
| | 8 | " | ↓ | ↓ | 52.5 | " |
| | 9 | " | ↓ | | 47.5 | " |

*Flue Gas feed $NO_x$ content for cycles 2497 and 2498.
**$NO_x$ in feed for cycles 2526 through 2532 was assumed to be constant at 542 ppm, the value determined by the PDS method at the start of cycle 2529.
***Meter reading at time 0 is at moment $NH_3$ and $NO_x$ feed was started and low reading is due to gas trapped in sample system from preceding cycle.

In the above cycles, ammonia was fed through the rotameter at a temperature of 98°–101° F. and at a pressure of 5 psig.

A number of operating cycles were carried out during which nitrogen oxide effluent determinations were not made. This explains why the above cycles are not consecutive cycles.

In addition to the tests analyzed by the Dynasciences Air Pollution Monitor instrument, several cycles of combined $SO_x$ and $NO_x$ removal operation were analyzed by catching a series of samples (over a 15 to 20 second period for each sample using the evacuated sample flasks as described for the phenyldisulfuric (PDS) method outlined in the Federal Register reference previously given). These results, shown in Table V below, show substantial agreement with those of Table IV relative to the ratio of $NO_x$ removed for a given $NH_3/NO_x$ ratio in the flue gas being processed.

TABLE V

| Cycle | Time Min. | Feed $NO_x$ ppm | cc/min. $NH_3$ | $NH_3/NO_x$ Feed mol ratio | Effluent $NO_x$ ppm | Method |
|---|---|---|---|---|---|---|
| 2520 | 0.5 | 443* | | | 14 | PDS |
| | 2.0 | " | | | 35 | " |
| | 5.0 | " | 215 | 2.4 | 25 | " |
| | 8.0 | " | (average) | (average) | 11 | " |
| 2522 | 0.5 | 443* | | | 67 | " |
| | 2.0 | " | 218 | 2.5 | 36 | " |
| | 5.0 | " | (average) | (average) | 27 | " |
| | 8.0 | " | | | 19 | " |
| 2529 | 0.5 | 542** | | | 207 | " |
| | 2.0 | " | 56 | 0.5 | 209 | " |
| | 5.0 | " | (average) | (average) | 128 | " |
| | 8.0 | " | | | 228 | " |
| 2533 | 0.5 | 542** | | | 133 | " |
| | 2.0 | " | 108 | 1.0 | 51 | " |
| | 5.0 | " | (average) | (average) | 0 | " |
| | 8.0 | " | | | 30 | " |

*Feed sample in cycle 2520; determined by PDS method.
**Feed sample in cycle 2529; determined by PDS method.

During the tests given in Tables IV and V, about 90% to 95% of $SO_x$ was removed from the flue gas.

Two additional cycles were carried out to determine whether or not the copper in the sorbent is capable of reducing significant quantities of $NO_x$ in the absence of ammonia. Table VI below shows two cycles which were carried out in the same manner as the other cycles in this Example, except that no ammonia was added. In each, the last preceding cycle with added ammonia was run several cycles earlier, so that the reactor was purged of ammonia. Nitrogen oxide contents were determined by the PDS method.

From data below, it is concluded that freshly reduced copper may reduce some $NO_x$ at the start of a sorption period. But it is also evident that the oxidized or sulfated copper present after several minutes of sorption does not reduce $NO_x$. Hence, the continued $NO_x$ removal during the $NH_3$-addition period is due to the selective reduction of $NO_x$ by $NH_3$.

TABLE VI
EFFECT OF COPPER-ON-ALUMINA
ON $NO_x$ AFTER $NH_3$ ADDITION IS DISCONTINUED

| | $NO_x$ Content (ppm)* Reactor Sample Point | | Elapsed Sorption |
|---|---|---|---|
| Cycle No. | Inlet | Outlet | Time, Min. |
| 2518 | 519 | 392 | Not noted |
| 2538 | 597 | 107 | 2 |
| | | 389 | 5 |
| | | 517 | 8 |

*Analyses by PDS method

EXAMPLE 3

This example describes the simultaneous removal of nitric oxide and sulfur dioxide from synthetic flue gas in a laboratory reactor containing a commercial copper oxide on alumina fixed bed catalyst-sorbent.

The reactor was a one-inch diameter glass reactor containing, as the catalyst-sorbent, 24.9 g. (30 cc.) of 10–14 mesh alumina spheres impregnated with 8% by weight of Cu, which was initially in the form of copper oxide. The synthetic flue gas contained 0.27% by volume of $SO_2$, 0.12% by volume of NO, 5.0% by volume of oxygen, 0.6 to 2.0% by volume of water vapor, balance nitrogen.

A number of cycles, each consisting of a 30-minute sorption period, a one-minute purge period, a 2-minute regeneration period, and a second one-minute purge period, were carried out.

During each sorption period, a preselected amount of ammonia was dissolved in a preselected amount of water. The resulting solution was vaporized, and the ammonia-steam mixture was added to the remaining constituents of the synthetic flue gas. The resulting mixture was passed through the reactor at an inlet temperature of 650° F. and a space velocity of 5000 V/V/Hr. Effluent NO concentrations were determined with the Dynasciences measuring instrument described in Example 1. Following each sorption period, the reactor was purged with nitrogen for one minute.

The catalyst-sorbent was then regenerated for two minutes with a gas mixture of 86% by volume of hydrogen and 14% by volume of water vapor. The reactor was then purged with nitrogen for one minute. The operating cycle was then repeated.

Ammonia was omitted during certain cycles for comparison purposes; otherwise, these cycles were carried out in the same manner as the other cycles in which ammonia was added.

Table VII below shows the amounts of NO and $SO_2$ in the effluent gas during the sorption periods of various cycles, using various amounts of added ammonia. The quantities of effluent NO are average values (a) for one or more entire sorption periods, and (b) for the last 23 minutes of one or more sorption periods. Effluent $SO_2$ values are average values for one or more entire sorption periods. Where more than one cycle is included on one line in Table VII, effluent NO and $SO_2$ concentrations represent average values. All feed and effluent concentrations are in ppm by volume.

TABLE VII

| Line | Cycle No. | Feed $NH_3$, ppm | Feed NO, ppm | Feed $SO_2$ ppm | $NH_3$/NO mol ratio | Effluent NO Entire period | Effluent NO Last 23 min. | $SO_2$ |
|---|---|---|---|---|---|---|---|---|
| 1 | 285-289 | 910 | 0 | 2700 | — | — | — | 275 |
| 2 | 291-292 | 0 | 0 | 2700 | — | — | — | 200 |
| 3 | 293 | 0 | 1200 | 2700 | 0 | 1200 | 1200 | 230 |
| 4 | 325-329 | 910 | 1200 | 2700 | 0.76 | 370 | 320 | 170 |
| 5 | 331 | 600 | 1200 | 2700 | 0.5 | 540 | 525 | 230 |
| 6 | 333 | 1200 | 1200 | 2700 | 1.0 | 210 | 30 | 230 |

From Table VII it can be seen that:

(1) Ammonia addition does not affect $SO_2$ removal (compare line 1 with line 2, and lines 4, 5 and 6 with line 3);

(2) Ammonia removes NO in the presence of $SO_2$ (compare lines 4, 5 and 6 with line 3);

(3) The effectiveness of NO removal is a function of the $NH_3$/NO mol ratio (lines 3-6); and (4) The catalyst-sorbent bed does not remove NO in the absence of $NH_3$.

The run from which the above cycles were taken included a number of cycles which were not germane to the present invention. Hence, cycle numbers are not sequential.

While the present invention has been described with some particularity by reference to particular embodiments thereof, it will be appreciated by those skilled in the art that the same lends itself to various modifications not necessarily described herein. Description in this manner is not, however, intended to limit the scope of the invention in any way and, indeed, reference should be made solely to the appended claims for purposes of determining the scope thereof.

What is claimed is:

1. A process for treating a gaseous mixture comprising nitrogen oxide, sulfur dioxide and oxygen in order to reduce selectively the nitrogen oxide content thereof by conversion of the nitrogen oxide to nitrogen which comprises:

(1) adding ammonia to said gaseous mixture;

(2) contacting said gaseous mixture and said ammonia under oxidizing conditions at a gas inlet temperature of about 600° F. to about 900° F. with a non-noble metal containing catalyst comprising copper oxide or vanadium pentoxide supported on a refractory carrier, said copper oxide or vanadium pentoxide being converted during the course of contact with said gaseous mixture and ammonia to copper sulfate or vanadium sulfate while remaining effective for promoting the conversion of nitrogen oxide to nitrogen; and (3) discontinuing contacting said catalyst with said gaseous mixture and ammonia, contacting said catalyst with a reducing gas at a gas inlet temperature of about 600° F. to about 900° F. and thereafter continuing contacting said catalyst with said gaseous mixture and ammonia as in steps (1) and (2).

2. The process of claim 1 in which the amount of ammonia added is at least about 0.5 mole per mole of nitrogen oxide present in said gaseous mixture.

3. The process of claim 1 wherein the amount of ammonia added to said gaseous mixture varies from about the stoichiometric amount of ammonia required to consume completely said nitrogen oxide to about 4 moles of ammonia per mole of nitrogen oxide.

4. The process of claim 1 wherein said non-noble metal containing catalyst is copper oxide on alumina.

5. The process of claim 2 wherein said non-noble metal catalyst is copper oxide on alumina.

6. The process of claim 1 wherein said non-noble metal catalyst is copper oxide in admixture with a material selected from the group consisting of iron oxide, cobalt oxide, nickel oxide, chromium oxide, molybdenum oxide or tungsten oxide contained on alumina.

7. The process of claim 2 wherein said non-noble metal containing catalyst is copper oxide in admixture with a material selected from the group consisting of iron oxide, cobalt oxide, nickel oxide, chromium oxide, molybdenum oxide or tungsten oxide contained on alumina.

8. The process of claim 1 wherein said non-noble metal containing catalyst is vanadium pentoxide on alumina.

9. The process of claim 2 wherein said non-noble metal containing catalyst is vanadium pentoxide on alumina.

10. The process of claim 1 wherein said gaseous mixture comprises nitrogen oxide, from about 0.1 to 0.5% by volume of sulfur dioxide and about 0.5 to 8% by volume oxygen and said sulfur dioxide is removed from said gaseous mixture by contact with said catalyst simultaneously with the conversion of the nitrogen oxide to nitrogen.

11. The process of claim 5 wherein said gaseous mixture comprises nitrogen oxide, from about 0.1 to 0.5% by volume of sulfur dioxide and about 0.5 to 8% by volume oxygen and said sulfur dioxide is removed from said gaseous mixture by contact with said catalyst simultaneously with the conversion of the nitrogen oxide to nitrogen.

12. A process for treating a gaseous mixture comprising nitrogen oxide, sulfur dioxide and oxygen in order to reduce selectively the nitrogen oxide content thereof by conversion of the nitrogen oxide to nitrogen which comprises:
  (1) adding at least about 0.5 mole of ammonia to said gaseous mixture per mole of nitrogen oxide contained in said gaseous mixture;
  (2) contacting said gaseous mixture and ammonia under oxidizing conditions at a gas inlet temperature of about 650° F. to about 800° F. with a non-noble metal containing catalyst comprising copper oxide supported on an alumina having a surface area of at least about 80 square meters per gram (by nitrogen absorption), said copper oxide being converted during the course of contact with said gaseous mixture and ammonia to copper sulfate while remaining effective for promoting the conversion of nitrogen oxide to nitrogen; and
  (3) discontinuing contacting said catalyst with said gaseous mixture and ammonia, contacting said catalyst with a reducing gas at a gas inlet temperature of about 600° F. to about 900° F. and thereafter continuing contacting said catalyst with said gaseous mixture and ammonia as in steps (1) and (2).

13. The process of claim 12 wherein said gaseous mixture comprises nitrogen oxide, from about 0.1 to 0.5% by volume of sulfur dioxide and about 0.5 to 8% by volume oxygen and said sulfur dioxide is removed from said gaseous mixture by contact with said catalyst simultaneously with the conversion of the nitrogen oxide to nitrogen.

* * * * *